Aug. 9, 1966     A. MARZOCCHI ET AL     3,265,530

AUTOMOBILE HEADLINER AND METHOD FOR MAKING THE SAME

Filed March 13, 1961

ALFRED MARZOCCHI,
FRANK O. BRISLEY &
JAMES J. DILLON
      INVENTORS

BY

ATTORNEYS

United States Patent Office 3,265,530
Patented August 9, 1966

---

3,265,530
AUTOMOBILE HEADLINER AND METHOD FOR MAKING THE SAME
Alfred Marzocchi, Cumberland, R.I., Frank O. Brisley, Newark, Ohio, and James J. Dillon, Providence, R.I., assignors to Owens-Corning Fiberglas Corporation, Toledo, Ohio, a corporation of Delaware
Filed Mar. 13, 1961, Ser. No. 95,415
4 Claims. (Cl. 161—203)

This invention relates principally to automobile headliners having bodies of molded fibrous glass and with attached surfacing sheets, and to a method of producing such headliners. While this invention may be utilized to advantage in forming flat sectional panels, its benefits are more fully realized in connection with the fabrication of complete headliners with curved edge portions.

Because of the environment with which headliners are associated they should be capable of yielding under impact and should be pleasing in appearance. The resilience, durability, sound and fire resistance of glass fiber masses make them especially suitable as the body portions of these products; and a surfacing sheet of fibrous glass cloth has the pliability to comply with the desired compressibility, while being tough enough not to be fractured by sharp blows. Such a covering is also decorative, and resistant to soil.

Considerable trouble has been encountered in producing fibrous glass headliners with surfacing sheets. The principal difficulty has been in obtaining a thoroughly satisfactory appearance.

Another obstacle in connection with headliners with woven surfacing sheets has been the difficulty of removing soil that has lodged between or under the yarns of the surfacing fabric.

Because of the compound curves present in a one-piece automobile headliner, the surfacing sheet must be capable of smoothly complying with non-planar surfaces. At the same time the sheet should be stiff enough not to follow minor undulations in the contour of the fibrous glass body.

A further troublesome factor has been in securing adequate and uniform adhesion of the sheet with the body portion.

If the surfacing sheet is thermoplastic or is associated with a thermoplastic adhesive film, care must be taken to prevent disintegration of the plastic component when applying the heat required to cure the binder of the fibrous glass mass of which the headliner body is molded.

Other troubles have involved bleeding of the dark colored binder into the surfacing sheet and extrusion of the adhesive through the sheet. Any procedure which overcomes these cited obstacles must also be economical and productive to be commercially feasible.

The principal object of this invention is to overcome these prior difficulties and to provide a highly satisfactory headliner, as well as a practical method of producing it.

A more specific object is to provide a method of adhering a surfacing sheet to the main body of a headliner without detracting from the final appearance of the headliner.

A further important object is to provide a headliner with an attractive surfacing sheet of fibrous glass cloth that is not penetrated by soil and when dirtied is easily cleaned.

Another object of the invention is to provide a headliner which may be molded with less difficulty and which may be installed expeditiously.

These and other objects of the invention are attained by compressive molding the headliner from a body of fibrous glass carrying a dispersed impregnation of a heat settable binder and applying heat to set the binder while the body is held compressed in the final shape desired. The method further entails adhering a covering sheet of fibrous glass cloth to the body of fibrous glass during the molding operation. In addition the method comprises the use of an interposed thermoplastic film in a preferred thickness of three or four mils and in a color substantially matching the color of the glass cloth to adhere the cloth to the body of fibrous glass during the molding operation.

Further contributing to the attainment of the objects of the invention are the attachment of a waxed paper backing to the headliner and the adherence of a thin film of thermoplastic to the outer surface of the fibrous glass cloth in the molding operation.

The preferred manner of practicing the invention will be described in more detail hereafter in connection with the accompanying drawings in which.

The headliner produced by the practice of this invention is designed for placement against and covering the complete inner side of the roof of an automobile body.

The fibrous glass of the panel body not only serves as an acoustical shield against road noise and as a heat insulating agent, but also has a cushioning effect should a passenger bump against it.

The fibrous glass pack from which such panels are constructed may be produced in a standard forming line, involving a furnace, from the forehearth of which molten glass is projected in fine streams through numerous ports in multiple bushings. High pressure steam or air discharged from associated manifolds attenuate the stream of glass into fine fibers. The latter fall in a random arrangement down within a form'ng hood and collect in a web or pack upon the foraminous surface of traveling conveyor, which passes across the bottom of the hood.

During the downward movement of the fibers, particles of a bonding agent are interspersed among the fibers by spray devices. The binder is preferably a phenol formaldehyde resin which my be extended about twelve percent by an addition of "Vinsol," a turpentine rosin derivative. The proportion of the binder should be between ten and twenty-six percent by weight of the final cured pack, and preferably about sixteen percent.

The size of the glass fibers produced in such a production line may vary within a wide range and yet serve adequately as stock in the product of this invention. Should it be desired to utilize fibrous glass packs of particularly fine fibers, for example with diameters below twenty-five hundred-thousandths of an inch, the production line would then conventionally incorporate either centrifugal or combustion gas type of fiber forming apparatus.

Glass fibers with diameters approximately thirty hundred-thousandths of an inch in diameter have been found to be very satisfactory and are recommended for the practice of the invention.

The formed pack of glass fibers has preferably a density between two and three pounds per cubic feet, and a nominal thickness of approximately two inches. A single layer thereof is adapted for use in the molding operation. Alternately, two layers with each only one inch in nominal thickness may be utilized in the molding step. This doubling up compensates for any uneven distribution of fibers in the pack. Air movements down through the conveyor promotes the deposit of the fibers thereon, and also provides a control medium for the pack density. The resulting pack is then cut to desired lengths by a vertically reciprocating knife or some other suitable severing device.

Because of the varying thickness of the final headliner panel the glass wool is compressed to different densities which may range as high as forty pounds per cubic foot along the edge of the panel where extra mounting strength is desired.

Figure 1:
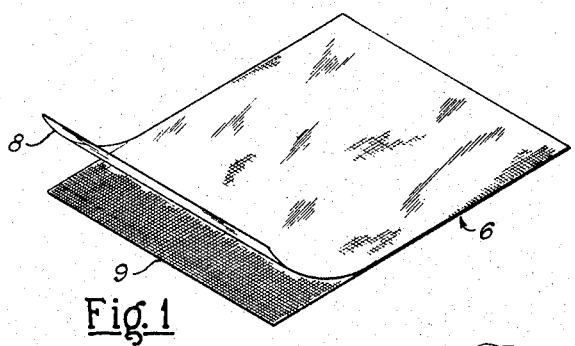
FIGURE 1 is a perspective view of a glass surfacing cloth and a plastic film by which the cloth is adhesively attached to the main body of the headliner.

Referring to the drawings in more detail, in FIGURE 1 the surfacing assembly 6 is shown with two components, the inner adhesive film of thermoplastic 8, and the outer facing element 9 comprising a woven fabric of glass yarn. The two parts are preferably unattached but may be preliminarily joined together by staples or by being pressed together between rollers. For heavily contoured headliners, the plastic film should be at least three mils in thickness and should desirably have a particularly smooth surface on the side away from the glass fabric.

While most thermoplastics may be utilized for this adhesive film, a four mil, high density, polyethylene has been found to serve most satisfactorily. Films of polyvinyl chloride, polyvinyl acetate and vinylidene chloride are examples of others which would be suitable. The color of the plastic film should match that of the glass fabric.

The woven cloth 9 of glass fibers may be of various weights and weaves. For texture effects, fancy weaves of curtain or tapestry types are preferred. These include such weaves as basket, honeycomb, bird's-eye and pique. More common plain, satin and twill weaves also provide an attractive appearance especially when in colors harmonizing with those of the automobile upholstery and interior finishes.

A cloth that has proved particularly successful is woven from a single strand yarn of a weight of one pound per 15,000 yards, utilizing continuous glass filaments about .00025 of an inch in diameter. There are fifty-six ends of warp per inch and fifty-four picks of fill per inch with the weight of the fabric being 4.3 ounces per square yard. The cloth is permanently colored in any one of a group of hues as specified by the auto manufacturer for whom the headliners are produced.

Figure 4:
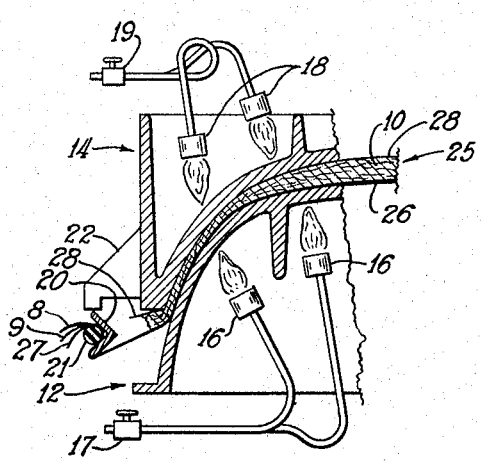
FIGURE 4 is a perspective view of a glass surfacing fabric with the plastic film by which it is attached and a supplemental film of plastic which is to be adhered to the outer surface of the glass fabric.

An alternate surfacing assembly 26 is shown in FIGURE 4. This includes the colored, adhesive polyethylene film 8, the facing 9 of glass fabric, and in addition a surface finishing thermoplastic film 27 preferably of clear polyethylene stock in a thickness of one or one and a half mils.

Figure 2:
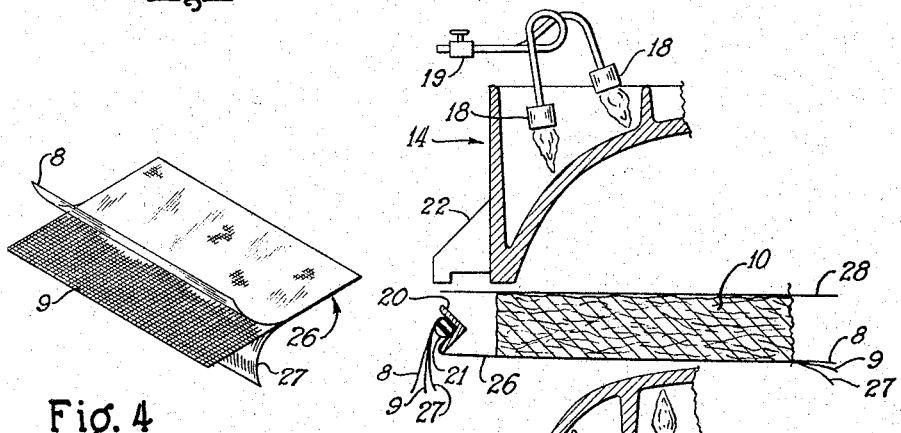
FIGURE 2 is a vertical section of an end portion of a mold for forming a headliner according to this invention with the mold in open position and the fibrous glass stock for the headliner body and the surfacing elements ready to be compressed in the mold.
Figure 3:
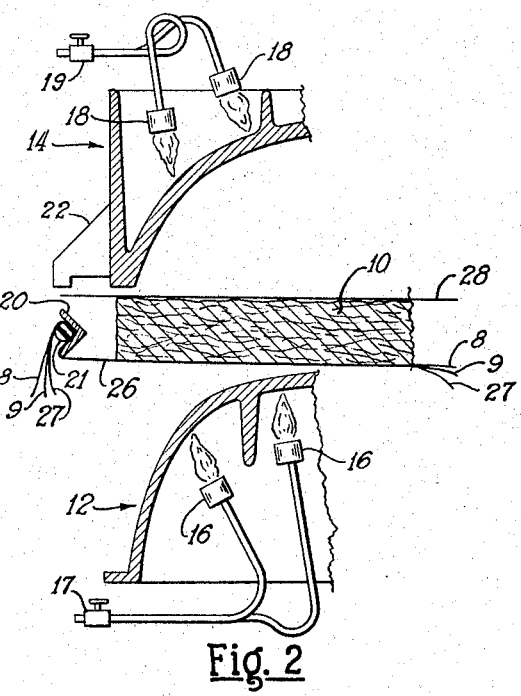
FIGURE 3 is a vertical sectional view like that of FIGURE 2 but with the mold closed and the headliner in its final molded form.

A method of creating a headliner according to this invention is depicted diagrammatically in FIGURES 2 and 3. As shown therein, the glass wool 10, impregnated with a heat settable binder, is preliminarily supported upon the assembly 26 including the plastic film 8, the glass cloth 9, and the light finishing film 27. The edges of the three assembly components are retained in an annular V-section frame 20 by the elastic cord 21. A sheet of paper or plastic, but most desirably waxed kraft paper, is placed over the glass wool 10 as indicated at 28 in FIGURE 2.

The frame is utilized to carry the elements to the open mold and to locate them properly in assembled relation between the lower mold section 12 and the upper mold section 14.

The frame 20 is placed upon an auxiliary frame associated with the mold and which is yieldably held in its initial position by springs or counter weights.

The lower mold section 12 is heated by burners 16. These may be controlled as desired by bending their tubular mountings and by adjustment of the valves 17. In like manner the upper mold section 14 is heated by positionable burners 18 with the flame size governed by the setting of valves 19.

On downward closing movement of the upper mold section 14 brackets 22 projecting from the sides of the section abut frame 20 and drive it downward with the auxiliary frame yielding under the pressure.

The glass cloth 9, with the enclosing films 8 and 27, is thus brought against the lower mold 12 and is stretched down over the curved sides of this mold section by the forced descent of the frame 20. Where the cloth sufficiently resists the stretching action, the elastic retaining cord 21 permits the marginal portion of the cloth to slip past the cord to provide additional cloth area. The plastic films 8 and 27 in accompanying relation with the glass cloth 9 are also forcefully laid over the lower mold. Being of an elastic nature and also being softened by the heat the films are more subject to stretching. The heavier film 8 may fold into doubled thicknesses particularly at the corners where the draft is deeper.

While it is desirable to heat the films to a stage of adhesiveness to attach them to the glass cloth and to attach the cloth to the main body, the heat reaching the films should not be sufficient to destroy their continuous character. For this reason the heat applied to the lower mold section is less than that to which the upper mold is raised.

The speed of the molding action is limited by the time required to set the binder of the glass fibers of the main body of the headliner. A temperature as high as 500° F. may be best for this purpose. However, the disintegrating temperature of most thermoplastics may be around 350° F.

As a denser composition of polyethylene withstands increased temperatures, such polyethylene films are preferred in the practice of this invention. A composition having a density between 0.926 and 0.965 gram per cubic centimeter is accordingly prescribed. Also, by having the main plastic film 8 in a thickness of at least three mils, resistance to disintegration from the effect of the applied heat is improved. However, it is desirable in order to curtail costs to limit the thickness of this glass fabric attaching film to no more than four mils, although somewhat thicker films would serve as well and even better in some respects.

The maintenance of the full integrity of the surface finishing film 27 is not so essential, and its function is satisfactorily filled with a clear film in a thickness between one and two mils. With the added thickness and higher density polyethylene of the main film 8, the temperature of the lower mold may be raised to the region of 375° F., with the temperature of the upper mold between 425° or 460° F. The possibility of breakdown of the plastic films is minimized by restricting the molding period to the least time required for setting the binder. For the particular dimensions and specifications of materials as described herein, this should be between two and three minutes. For thinner and less dense fibrous body stock, the molding period may need be only a minute or less; while for bulkier stock and slower curing binders, the time required would be extended considerably, for example, to as much as ten or fifteen minutes.

Because of the heavier gauge of plastic film 8 and particularly when this film is doubled in thickness in curved areas the plastic material thereof exudes into the glass cloth. For this reason this plastic film should be substantially the same color as the glass cloth. The penetration of the plastic into the cloth, which is desirable from an attachment standpoint, does not then affect the color of the cloth. Another characteristic desired in the plastic film 8 is an extra smooth surface on the face contacting the fibrous glass stock 10. This permits easy slippage between the two materials and facilitates the mold conforming movement of the fibrous glass stock. Films from different sources vary in finish and it's a matter of selection from samples to obtain stock of the greatest smoothness.

Without the presence of the plastic film 8 the dark colored binder impregnant of the glass fiber body may under the pressure and heat of the molding operation be forced into and stain the glass cloth facing.

This plastic film also improves the washability of the headliner as it prevents a cleaning solution from entering the main body of the headliner. In the same manner the film provides resistance to moisture. The cleanability of the product is further improved considerably by the outer uncolored film 27 which enters the interstices of the cloth weave and fuses with portions of film 8 which have penetrated the cloth.

The wax paper 28 laid over the fibrous glass stock 10 and molded with it has several beneficial functions. It may first serve as a separator sheet between units of the stock 10 when stacked for delivery to the mold from the fibrous mat production line. In the molding operation it prevents sticking of the binder impregnated fibrous glass mass to the upper mold 14 and is a quick release medium. As an integrated upper cover for the completed headliner, it retains loose fibers and presents a smooth surface, comfortable to the touch of installation personnel, and one that facilitates slipping the headliner in place to be snapped over the metal trim channels of the automobile body. The wax paper functions most satisfactorily and is economical in cost. Other materials which would serve quite as effectively include plastic films and cellophane.

In review, it should be noted that there are various features contributing to the success of the invention. These include a plastic film for joining the covering glass cloth to the body of greater thickness than the two mil gauge ordinarily utilized as an adhesive interlayer, and also a film matching the color of the outer glass cloth. Supplemental characteristics of the film which are advantageous are its extra smooth surface in contact with the fiber glass mass permitting easier conforming of the mass to the shape of the mold and its higher density which cooperates with its greater thickness in withstanding higher curing temperatures for the fibrous glass binder. This film is only heated to the degree where it becomes softened for attachment while its continuous film formation is unaffected.

A further important aspect of the invention is the enveloping of the glass cloth between the heavy interior film of polyethylene and the thin finishing film. The film character of the two films is maintained while at the same time they are fused together through the interstices of the cloth.

The inner film functions to adhere the cloth to the main body of fibers and also maintains the attractive appearance of the cloth by matching it in color. The thin finishing sheet of clear polyethylene is responsible for preventing penetration of soil and presenting a surface extremely easy to clean. It also locks the cloth to the inner adhesive film by fusing with the inner film through the interstices of the fabric.

The backing of wax paper (or alternately a sheet of plastic, aluminum foil, or plain paper) not only facilitates the molding procedure, but also greatly improves the handling characteristics of the headliner.

In regard to materials involved, it should be acknowledged that various other fibrous glass bonding agents are well known and would be equally effective. Likewise, adhesive thermoplastic films other than those mentioned could could be easily adapted to the practice of this invention. Also it is recognized that other mineral and organic fibers are comparable to glass fibers though usually inferior in properties, and may be substituted therefor in some instances without too severe an effect upon the resulting products. Examples of such comparable fibers include those of rock wool, rayon, polyester and cellulose.

Instead of fibers, the body of the headliner may be formed with one of the plastic foams which are available in open or closed cell, flexible and rigid types. Depending upon the material preferred, either a liquid or beads of the basic resin are poured in the mold. The foaming of the resin may occur at room temperature, with the application of heat, or induced by a flow of steam, according to the resin formulation utilized. Urethane and polystyrene foam resin materials are among those which are serviceable.

Accordingly, it is desired that the accompanying claims be interpreted sufficiently broadly to encompass obvious alternate materials and natural modifications in the product and processing procedure as herein described.

We claim:

1. A contoured headliner for a passenger conveyance having a heat and sound insulating body of randomly arranged bonded fibers, said body being resiliently compressible, a colored surfacing fabric of fibrous glass and a continuous plastic film interlayer directly adhering the surfacing fabric to the body, said plastic film interlayer being between three and four mils in thickness and in a color matching that of the surfacing fabric.

2. A headliner for a passenger conveyance having a heat and sound insulating body of randomly arranged bonded fibrous glass, said body being resiliently compressible, a surfacing fabric of fibrous glass, a plastic film interlayer fused to both the insulating body and the surfacing fabric and thus holding the surfacing fabric upon the insulating body, and an exteriorly placed plastic film adhered to the outer side of the surfacing sheet, said exteriorly placed plastic film being transparent and considerably thinner than the plastic film interlayer, and said exteriorly placed plastic film being fused to the plastic film interlayer through interstices of the surfacing fabric.

3. A method of forming an automobile headliner which comprises placing in overlying relation within a mold a surfacing fabric of fibrous glass, a continuous, imperforate thermoplastic interlayer of the same color as the surfacing fabric of the fibrous glass, a main insulating body of randomly arranged fibrous glass with a heat curable binder dispersed therethrough and a flexible sealing sheet, closing the mold with sufficient pressure to compress the body to the final shape desired in the product and applying heat to cure the binder and to fuse the thermoplastic interlayer, said application of heat being controlled to fuse the thermoplastic interlayer to an extent where it flows into the interstices of the surfacing fabric while still retaining its continuous, imperforate nature.

4. A method according to claim 3 in which a transparent thermoplastic film is first placed in the mold beneath the surfacing fabric and is fused by the application of heat into joining relation with the thermoplastic interlayer through the interstices of the surfacing fabric.

(References on following page)

References Cited by the Examiner

UNITED STATES PATENTS

| | | |
|---|---|---|
| 2,227,212 | 12/1940 | Beck. |
| 2,408,245 | 9/1946 | Walter _____ 156—247 |
| 2,460,571 | 2/1949 | Chaffee. |
| 2,577,205 | 12/1951 | Meyer et al. |
| 2,642,370 | 6/1953 | Parsons et al. |
| 2,674,488 | 4/1954 | Lyijynen et al. |
| 2,774,698 | 12/1956 | Jenk et al. |
| 2,809,910 | 10/1957 | Deddo. |
| 2,949,394 | 9/1960 | Rodman. |
| 2,978,376 | 4/1961 | Hulse. |
| 3,000,772 | 9/1961 | Lunn _____ 161—63 |
| 3,046,173 | 7/1962 | Copeland. |
| 3,060,068 | 10/1962 | Hannes. |

ALEXANDER WYMAN, *Primary Examiner.*

C. F. KRAFFT, EARL M. BERGERT, M. E. ROGERS, W. J. VAN BALEN, *Assistant Examiners.*